United States Patent [19]

Berg

[11] 3,979,247

[45] Sept. 7, 1976

[54] METHOD AND APPARATUS FOR DECORATING ARTICLES

[76] Inventor: Thomas L. Berg, 1110 23rd St., N. Bergen, N.J. 07047

[22] Filed: Jan. 15, 1975

[21] Appl. No.: 541,112

[52] U.S. Cl. .................................. 156/297; 101/40; 118/202; 118/211; 118/218; 118/223; 118/230; 156/234; 156/235; 156/238; 156/362; 156/384; 156/538; 156/540; 427/256

[51] Int. Cl.[2] ........................ B44C 1/24; B32B 1/02; B32B 31/20; B41F 17/14

[58] Field of Search .................. 101/38 R, 38 A, 40; 156/235, 240, 297, 230, 233, 234, 238, 277, 538–542, 560, 566, 567, 362, 384, 388; 427/256, 287; 118/202, 211, 218, 223, 230

[56] References Cited

UNITED STATES PATENTS

| | | | |
|---|---|---|---|
| 2,132,818 | 10/1938 | Cone | 101/40 X |
| 2,134,739 | 11/1938 | Schutz | 118/230 |
| 3,524,786 | 8/1970 | Spokowski et al. | 156/542 X |
| 3,564,998 | 2/1971 | Johnson et al. | 101/40 |
| 3,718,517 | 2/1973 | Berg | 156/234 |
| 3,842,733 | 10/1974 | Dubuit | 118/230 X |
| 3,928,116 | 12/1975 | Wahl | 156/540 X |

*Primary Examiner*—William A. Powell
*Assistant Examiner*—Thomas Bokan
*Attorney, Agent, or Firm*—Kenyon & Kenyon Reilly Carr & Chapin

[57] ABSTRACT

A method and apparatus for decorating the outer surface of an article or ware at a plurality of decorating stations wherein registration between the decoration applied at each of the plurality of stations is maintained. The article is advanced to each of the decorating stations at which a predetermined decoration is applied. The movement of the article as it is advanced to the subsequent station is controlled with the article being rotated a predetermined amount such that the orientation of the article at each of the decorating stations is appropriate for the particular decoration being applied.

6 Claims, 11 Drawing Figures

METHOD AND APPARATUS FOR DECORATING ARTICLES

BACKGROUND OF THE INVENTION

This invention relates generally to a method and apparatus for decorating articles, and more particularly to one wherein the articles are decorated at a plurality of stations and registration of the article is maintained between stations.

Packaging trends have today made it desirable to employ multi-color designs having a high quality decoration to provide a more attractive and marketable package for the product. The hot stamping technique in this connection provides a system wherein a high quality and rich metallic decorative design may be applied to a variety of differently shaped containers including multi-color designs of an infinite variety.

In my earlier U.S. Pat. No. 3,718,517, issued on Feb. 27, 1973, a machine is disclosed which is readily adaptable for hot stamping and heat transfer decorating and which produces a high quality decorative design on a variety of differently shaped containers at a high production rate. As is the case in my earlier patent, where a multi-color design is being applied to a single container, each of the several colors is generally applied at a different decorating station. In those instances where several colors are applied to the same article or container, registration between the colors is important and in some cases critical. Furthermore, in certain instances when an article is being decorated at two or more decorating stations with the same color, registration between the design applied at one station must be maintained with respect to that applied at another station. Accordingly, in many instances where multi-station decorating is utilized, movement of the article between the stations must be controlled in order to accomplish the desired registration between the designs being applied.

In my earlier U.S. Pat. No. 3,718,517, a versatile machine is described wherein the outer surface of an article is decorated by means of a die disposed at a decorating station. The article being decorated is rotatably mounted on a rotary table which advances the article to each decorating station which in the case of the illustrated embodiment is two decorating stations. At each of the decorating stations, a layer of transfer material is interposed between the die and the article, the former causing the transfer material to engage the rotatable article. As the die is moved across the outer surface of the article, a portion of the transfer material is thereby adhered to the article in the form of the desired decoration.

A plurality of mandrels are mounted on the rotary table for supporting the articles to be advanced to the decorating stations. After decoration at the first station is completed, the rotary table advances the article to the subsequent station where the process is repeated. The two decorating stations may be employed to impart a multi-color design on to the article or imprint onto the article two different designs with separate dies either in one or more colors.

In my earlier patent, the plurality of mandrels mounted to the rotary table were interconnected with one another by means of flexible belts which resulted in all the mandrels being rotated simultaneously to maintain proper registration with respect to one another. Thus, when the mandrel at one of the decorating stations is rotated, the remaining mandrels simultaneously rotate therewith in order to register each of the articles mounted on the mandrels with respect to one another.

Although such a registration system is satisfactory for general purpose decorating, certain specialized applications exist wherein a greater degree of accuracy is required between the designs applied at the several decorating stations. One such situation occurs with a design such as a rectangle which includes within its border printing of a different color. The rectangle in this case is applied at one station in a first color along with certain other indicia. The design imparted at the other station is in a second color and includes the printing which appears within the border of the rectangle. In order to accomplish the positioning of the two designs with respect to one another it is necessary to position the article at the second station with the same orientation as existed at the first decorating station. Thus, the article must be rotated between the first and second decorating stations an angular distance such that the article arriving at the second station is rotated to the orientation with which it arrived previously at the first decorating station. In other words, the article must be rotated 360° plus the angular distance between the first and second decorating stations. A method and means are disclosed herein whereby the article is so positioned at the first and second decorating stations to facilitate a specialized decorating application of the types described above.

SUMMARY OF THE INVENTION

Briefly stated, the invention herein provides for decorating the outer surface of an article at a plurality of decorating stations and employs a rotary table upon which a plurality of mandrels are rotatably mounted. The articles being decorated are placed on the mandrels which in turn are moved from one decorating station to another. Disposed between the first and second decorating stations is a registration means which controls the rotation of the mandrel as it moves from the first to the second decorating station. A coupling, connected to the mandrel, is engagable with the registration means as the article is moved between the first and second decorating stations. The registration means and coupling are related to one another in such a manner so that the mandrel is positioned at the second decorating station in accordance with a predetermined relationship with respect to its orientation at the first decorating station.

More specifically, the registration means includes a plurality of spaced teeth or pins while the coupling means is a gear like member engagable therewith. The ratio of teeth on the registration means to the ratio of teeth on the gear is such that the mandrel is caused to rotate between the first and second decorating stations 360° plus the angular distance between the decorating stations. In this manner, the mandrel is positioned with the same orientation at the first and second decorating stations.

In operation, each article is mounted onto one of the mandrels positioned on the rotary table which in turn is advanced to each of the decorating stations. At each of the decorating stations, the die causes the transfer material to be applied in accordance with the predetermined design. As the article is moved from one decorating station to another, its movement is restricted by a locking means and the coupling or gear mounted to the article holding means is engaged with the registration means positioned between each of the decorating stations. In this manner, the article is positively driven and caused to rotate between the first and second decorating station a predetermined amount and against the force of the locking means resulting in the article being positioned at the second decorating station with a predetermined orientation.

Accordingly, it is an object of this invention to provide an effective and reliable means for accomplishing accurate decorating at a plurality of decorating stations.

It is another object of this invention to provide an article decorating means wherein registration is maintained between each of the decorating stations.

It is still another object of this invention to provide an article decorating means capable of imparting a multicolored design with the colors appearing in registration with respect to one another.

These and other objects, advantages and features of the invention will become more apparent from the following description taken in conjunction with the accompanying drawings.

DESCRIPTION OF THE PREFERRED EMBODIMENT

Figure 1:
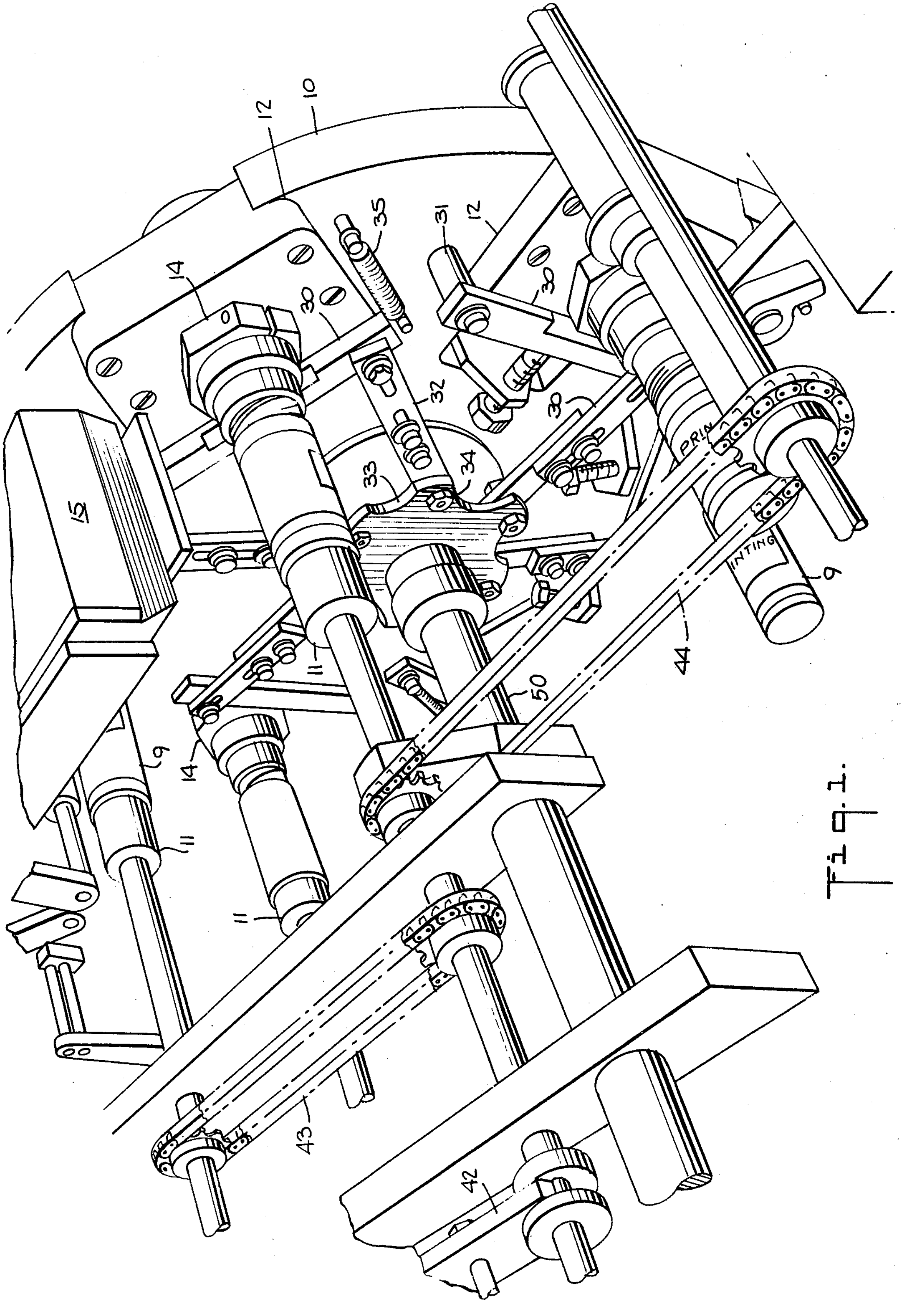
FIG. 1 is a perspective view of the rotary table advancing articles to a decorating station and the article holding means of the machine of this invention.
Figure 2:
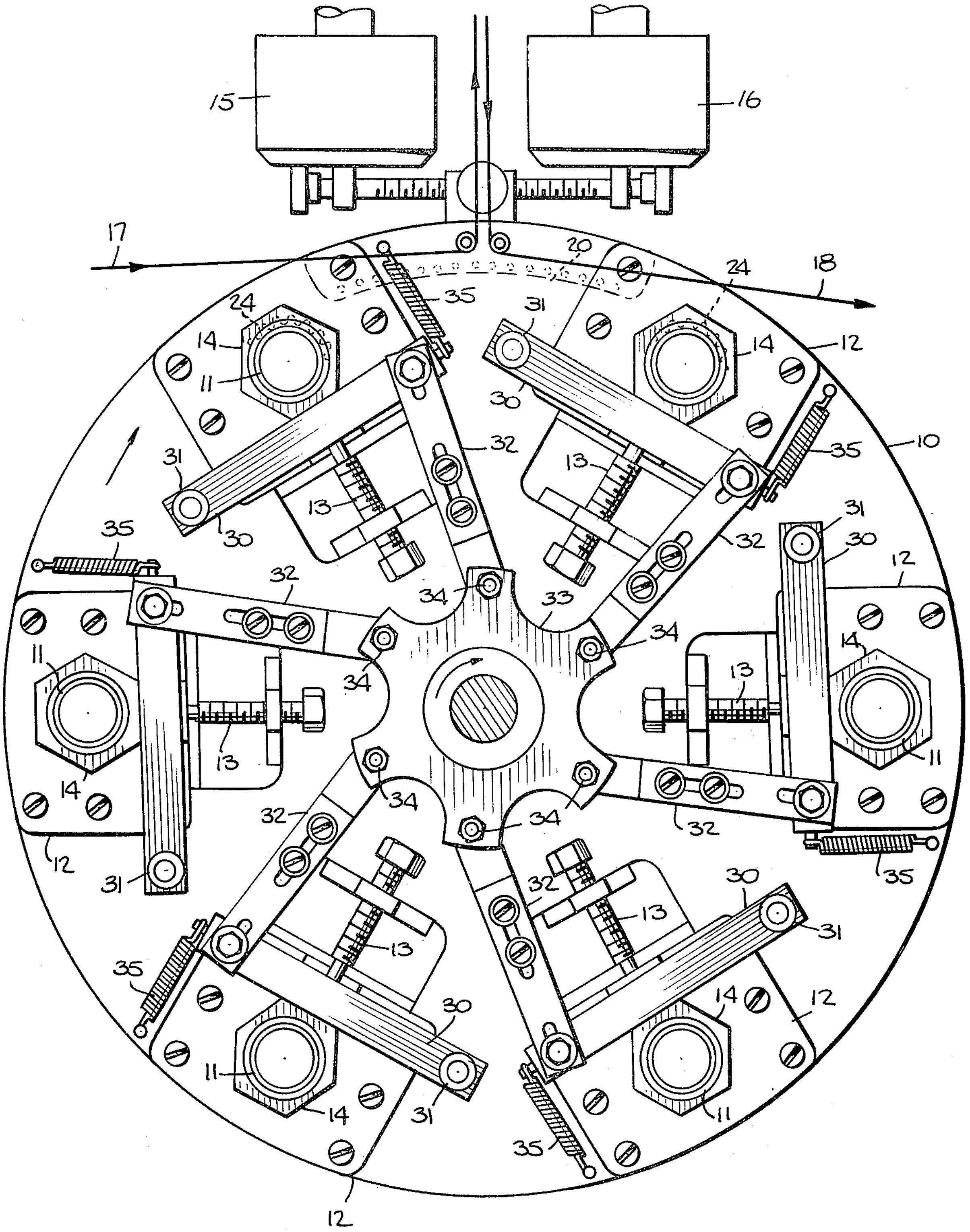
FIG. 2 is a partial front elevation view of the article decorating means of FIG. 1.
Figures 6, 7, 8, 9, 10, 11:
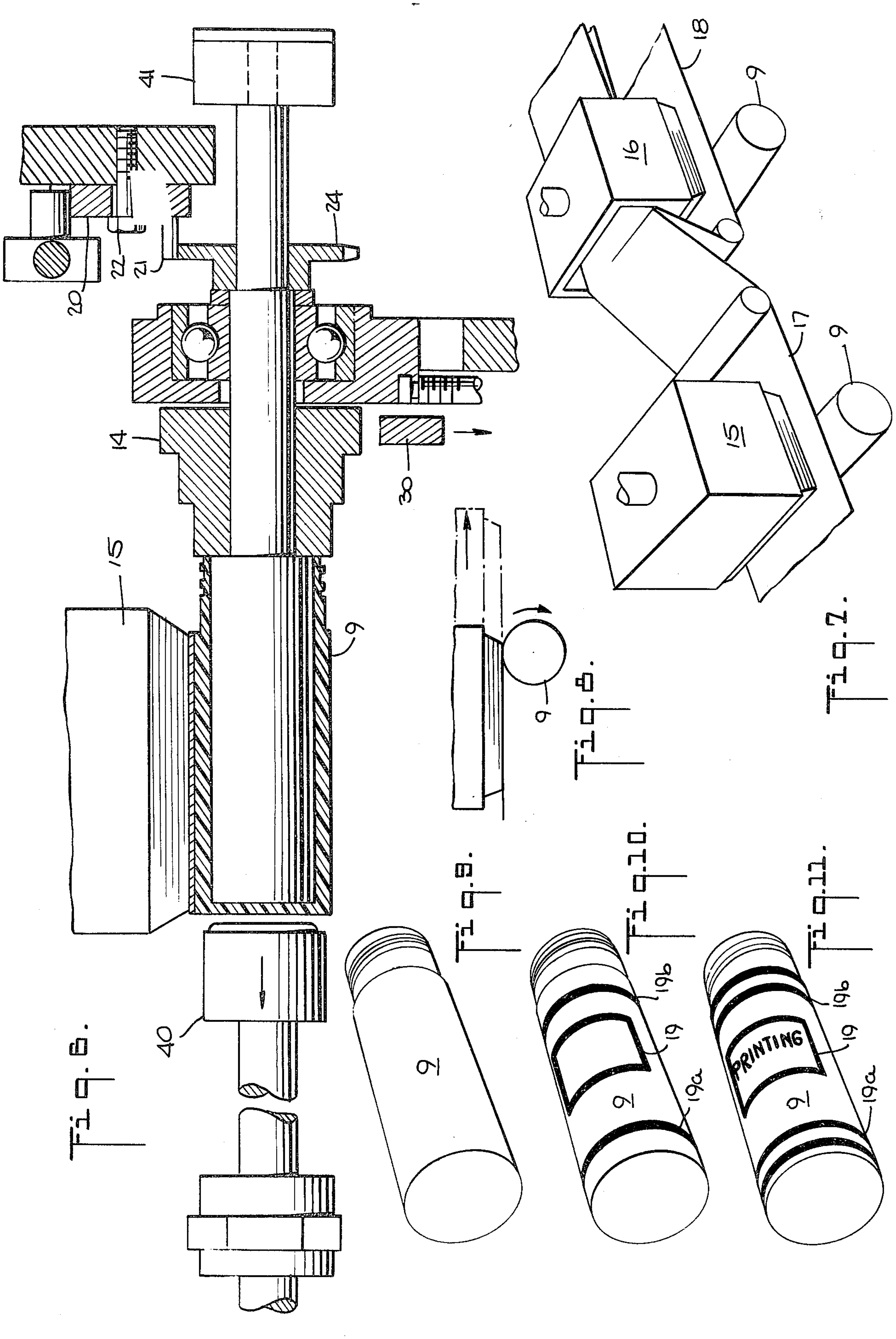
FIG. 6 is a side elevation view, partially in cross-section, taken along the line 6—6 of FIG. 5.
FIG. 7 is an enlarged perspective view of an article on each of the decorating stations.
FIG. 8 is an enlarged fragmentary front elevation view of the die engaging the article at the decorating station.
FIG. 9 is an enlarged perspective view of an article to be decorated.
FIG. 10 is an enlarged perspective view of an article having been decorated at a first decorating station.
FIG. 11 is an enlarged perspective view of an article having been decorated at a first and second decorating station.

The machine of this invention is of the same general type as described in my earlier patent. The drive means, particularly those for the rotary table, dies, transfer materials and the like are the same basically as those described previously in my U.S. Pat. No. 3,718,517. With reference to the drawings and particularly to FIGS. 1 and 2, a rotary table 10 is provided which includes a plurality of rotatable mandrels 11, onto which the article to be decorated 9, is mounted. Specifically, six identical mandrels 11 are provided and spaced 60° apart from one another. Each of the mandrels 11 is, as previously described in my earlier patent, mounted to the rotary table 10 by means of a base plate 12 which is radially adjustable with respect to the center of the table 10 by means of the adjustment screw 13. A hexagonal cam 14 is provided about the mandrel axis and adjacent the base plate 12. A pair of decorating stations 15 and 16 are spaced from one another with the dies at each station being capable of vertical movement into engagement with the article 9. Transfer material 17 is interposed between the die and the article to be decorated at the first decorating station 15 whereas a second transfer material 18 is interposed between the die and the article 9 at the second decorating station 16. Once the article to be decorated is indexed by the rotary table 10 into position at the respective decorating station 15 or 16, the die descends causing the transfer material 17 or 18 to be urged into engagement with the article 9 (FIG. 7). By a horizontal movement of the die across article 9, the predetermined design of the die engravings causes a portion of the transfer material to be adhered and decorated onto the surface of the article (FIG. 8). The article 9 is then advanced to the second station 16 whereat the decorating process is repeated and a second design is printed on the article.

Article 9, prior to decoration, is illustrated in FIG. 9. A decoration such as would be imprinted upon the article at the first decorating station is illustrated in FIG. 10 in the form of a rectangle 19 and two striped bands **19*a* and 19*b*. When, as is required in certain instances, a design or other printed indicia is desired to be positioned with respect to the first color such as is illustrated on FIG. 11, this is accomplished at the second station 16 with the article 9 being properly positioned so that the printing or indicia 19*c* is properly aligned with respect to that of the rectangle 19.**

In order to register the two different colored designs with respect to one another such as is necessary in situations as illustrated in FIG. 11, the article as it arrives at the second decorating station 16 with the same orientation as that with which it arrived at the first decorating station 15. In other words, the article 9 as it is moved from the first decorating station 15 to the second decorating station 16 must be rotated 360° plus the angular distance between the first and second decorating station which in the illustrated embodiment is 60°.

Figure 3:
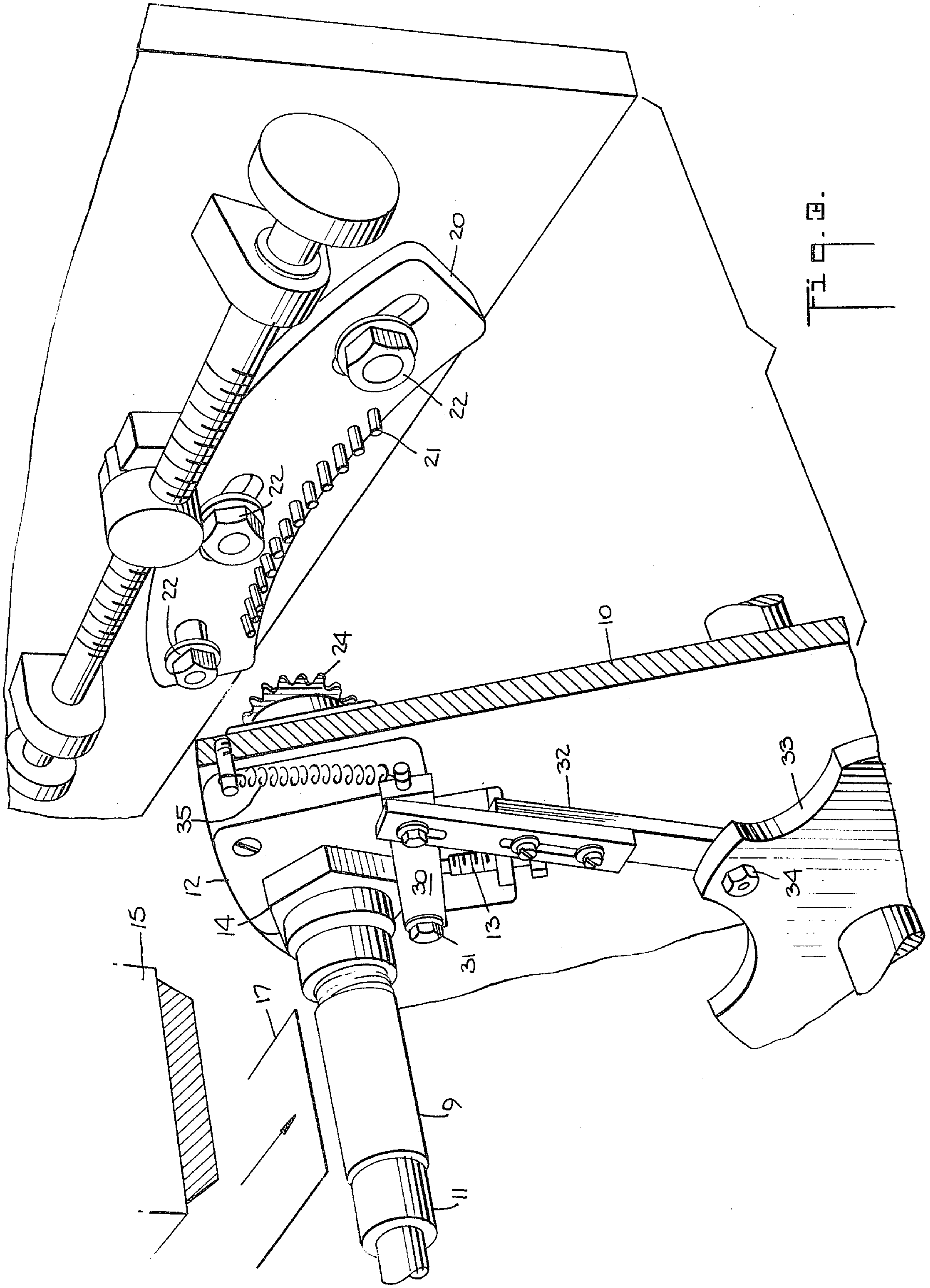
FIG. 3 is an enlarged partial perspective view of the registration means disposed between the first and second decorating stations.
Figure 4:
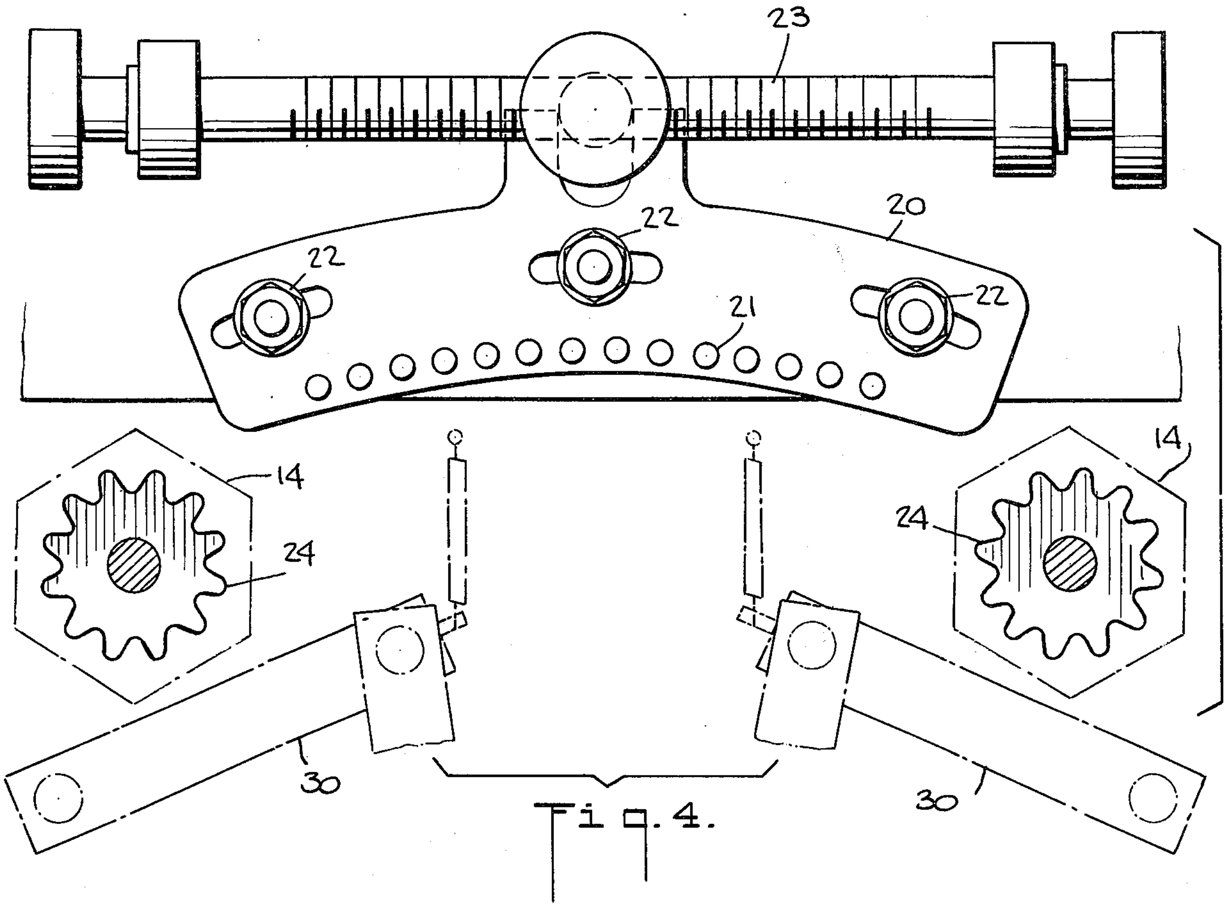
FIG. 4 is a partial front elevation view illustrating the article holding means positioned at the first and second decorating stations with the registration means disposed therebetween.
Figure 5:
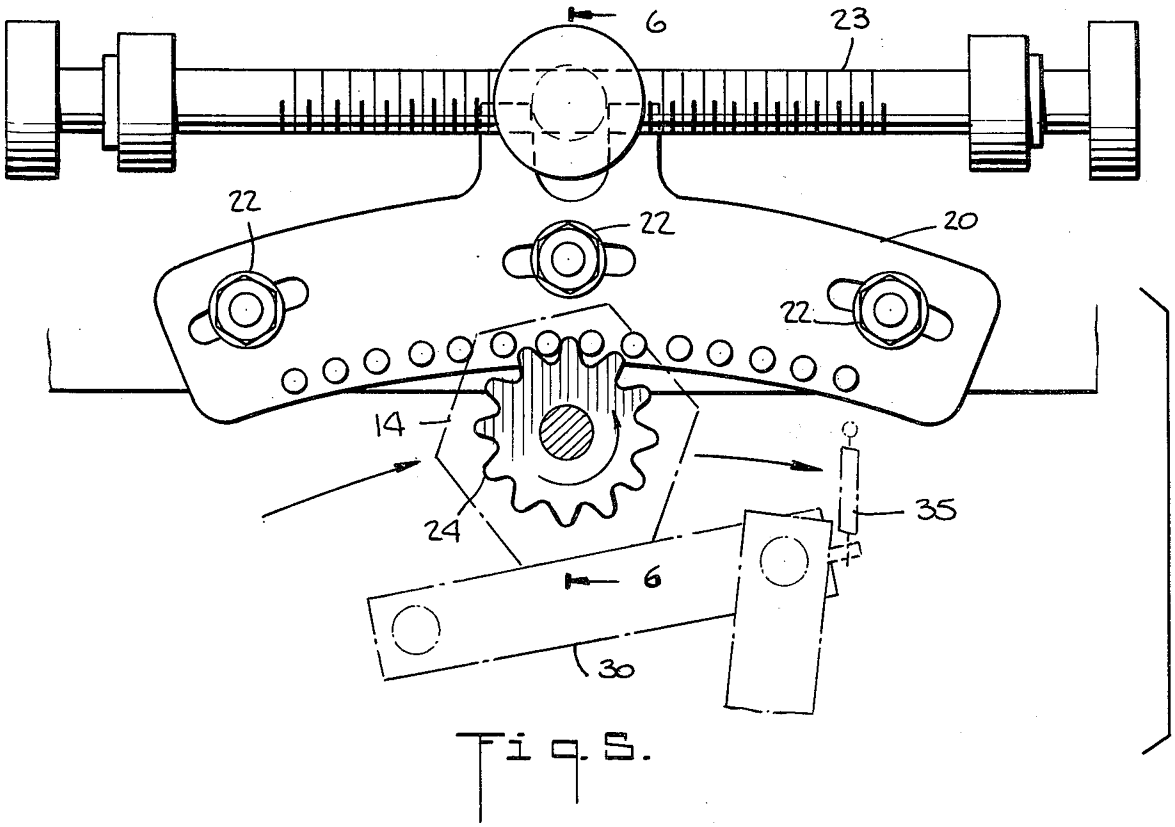
FIG. 5 is a partial front elevation view of the article holding means being moved between the first and second decorating stations.

With particular respect to FIGS. 3, 4 and 5, a registration or selector means 20 is disposed and centrally located between the first and second decorating stations 15 and 16 respectively. The registration or selector means 20 contains fourteen teeth or pins 21 and is mounted to the frame of the machine by means of the bolts 22. An adjustment screw 23 is in engagement with a threaded portion on the selector 20 and allows for proper positioning the latter between the two decorating stations 15 and 16. On the rearward side of the rotary table 10, each of the mandrel assemblies 11 is provided with a gear 24 which has twelve teeth and is engagable with the teeth 21 of the selector 20.

The registration or selector means 20 functions such that when the article 9 moves from the first to the second decorating station, the gear 24 engages the teeth 21 of the selector 20 and causes the article 9 to be rotated 420° (360° plus the 60° angular distance between the decorating stations 15 and 16). This is accomplished by the ratio of the teeth on the selector 20 and the teeth on the gear 24 being 14:12.

During movement between the first and second decorating stations 15 and 16 rotation of the article 9 is controlled by the registration or selector means 20. However, the article 9 as it is positioned at a decorating station is free to rotate and thereby facilitate printing. This is accomplished by means of a locking bar 30 being engaged with the hexagonal cam 14 provided at the base of each of the mandrel assemblies 11. The locking bar 30 functions such that it is removed or disengaged from the hexagonal cam 14 during movement between the first decorating station 15 and second decorating station 16 whereas it engages and locks in place the hexagonal cam 14 and mandrel assembly 11 during movement between the second decorating station 16 and first decorating station 15. As previously mentioned, when the rotary table 10 is not indexing, that is when an article is positioned at a decorating station, the locking bar 30 is disengaged from the hexagonal cam 14 and the mandrels 11 are free to rotate.

With particular reference to FIGS. 1–4, each locking bar 30 is pivoted about the screw 31 while at its other end a connecting link 32 couples it to the center drive wheel 33. The connecting link 32 is pivotally mounted to the drive wheel 33 by means of the screw 34. To insure that the locking bar 30 is biased into engagement with the hexagonal cam 14 a tension spring 35 is provided.

The locking bar arrangement functions such that as the articles are being decorated, the bar 30 is removed from the hexagonal cam 14 such as illustrated in FIG. 4 leaving the article free to rotate while engaged with the die. On the other hand, during indexing of the rotary table 10, bar 30 engages the hexagonal cam 14 and locks it in place. In the latter case, movement of the mandrel while advancing from the first decorating station 15 to the second decorating station 16 is controlled by the gear 24 engaging the teeth 21 of the registration means 20.

The mandrel 11 while at the printing station, as illustrated in FIG. 6, has its movement controlled by means of a front driving member 40 engaging the article 9 held on the mandrel 11 and a rear drive (not shown) engaging the clutch disc 41 at the other end of the mandrel assembly. These drives are synchronized with the horizontal movement of the die during the printing cycle. The drive means engaging the forward end of the mandrel clutch 40 is coupled thereto by means of the chain drive illustrated at 42, 43 and 44. The center drive wheel 33 is driven by an independent drive means engagable on the forward side with the shaft 50 (FIG. 1) which drive means is intermittent and synchronized with the drive means for the rotary table 10.

The operation of the machine is such that the vertical printing dies are moved toward the article 9 to be decorated at each of the decorating stations 15 and 16. Just prior to the printing die making contact with the article to be decorated, the front drive 40 is engaged with the mandrel and rear drive is engaged with the rear clutch disc 41 (FIG. 6). At the same time, the locking bar 30 is withdrawn from the hexagonal cam 14 by the connecting linkage 32 which is attached to the center wheel 33. In this manner, the mandrel 11 upon which is mounted the article to be decorated, is free to rotate during the printing cycle.

The dies then are moved vertically upward and removed from the article with the front drive 40 and rear drive being released and returned to the inactive position. The locking bar 30 is also released and urged into engagement with the hexagonal cam 14 by the tension spring 35. With the printing dies out of engagement with the article, the rotary table 10 advances the mandrels 11 one station. During movement between the decorating stations, 15 and 16 respectively, gear 24 engages the teeth 21 of the registration or selector means 20 and the movement of the mandrel 11 and article 9 is thereby controlled. The engagement of the locking bar 30 with the hexagonal cam 14 restricts the movement of the mandrel such that between the first decorating station 15 and the second decorating station 16, the article is positively driven by the engagement of the registration means 20 and the gear 24. As previously discussed, the ratio between the teeth of the registration or selector means 20 and the gear 24 is such that the mandrel 11 is rotated 420° and arrives at the second decorating station 16 with the same orientation as that which it arrived at the first decorating station 15. In this manner, the resultant printing is imparted on the article 9 at each decorating station in a manner precisely related to that applied at the other station.

Thus there has been described a means for accurately maintaining registration between various decorating stations. By the method and means disclosed herein, the positioning of the article is maintained under control during the entire rotational movement so that the design imparted at one station may be regulated with respect to that imparted at another station.

Although the above description is directed to a preferred embodiment of the invention, it is noted that other variations and modifications will be apparent to those skilled in the art, and may be made without departing from the spirit and scope of the present disclosure.

What is claimed is:

1. An apparatus for decorating the outer surface of articles at a plurality of decorating stations which comprises:

a. a first decorating station;

b. a second decorating station spaced from said first decorating station;

c. a rotary table adapted to advance the articles being decorated to said first and second decorating stations;

d. a plurality of mandrels rotatably mounted on said rotary table for supporting simultaneously articles to be decorated;

e. holding means engagable with each of said mandrels to restrict the movement of each of said mandrels during advancement of said rotary table so as to maintain orientation of the articles to be decorated with respect to one another;

f. registration means disposed between said first and second decorating stations for controlling the movement of each of said mandrels as it moves from said first decorating station to said second decorating station and changing the orientation of said article moving between said first and second decorating stations from that of the remaining articles mounted on said rotary table;

g. coupling means connected to said mandrel engagable with said registration means when the article is being moved from said first decorating station to said second decorating station, the relationship between said registration means and said coupling means being such that said mandrel is thereby positioned at said first and second decorating stations in accordance with a predetermined relationship; and h. means for releasing said holding means when said article is being decorated.

2. An apparatus in accordance with claim 1 wherein said registration means comprises a plurality of spaced teeth and said coupling means comprises a gear like member engagable therewith.

3. An apparatus in accordance with claim 2 wherein the ratio of the teeth of said registration means and said coupling means gear is of such a nature that the mandrel rotates between said first and second decorating stations 360° plus the angular distance between said first and second decorating stations so that the mandrel is thereby positioned with the same orientation at said first and second decorating stations.

4. An apparatus in accordance with claim 3 which further includes an adjustment means coupled to said registration means to allow for precise positioning of the latter.

5. An apparatus in accordance with claim 3 wherein said holding means includes a multiple faced cam mounted on each of said mandrels, a locking bar engagable with the faces of said cam for restricting the movement of said mandrel, and wherein said releasing means comprises a linkage means coupled to said locking bar which when said rotary table is at rest and an article is being decorated at said decorating stations disengages said locking bar from said cam so as to free said mandrel to rotate.

6. A method of decorating the outer surface of articles at a plurality of decorating stations including at least a first and second decorating station which comprises:

a. mounting the articles on mandrel type holding means provided on a rotary table;

b. advancing the rotary table and articles mounted thereon to the first of said plurality of decorating stations;

c. restricting the movement of said article during said step of advancing so as to maintain the orientation of the mounted undecorated articles with respect to one another;

d. releasing the article from its movement restriction while at said first decorating station so as to allow the desired decoration to be applied thereto;

e. decorating the article at said first decorating station;

f. engaging the article holding means with a registration means subsequent to said article being decorated at said first decorating station to control the movement thereof and causing said article to be rotated 360° plus the angular distance between said first and second decorating stations while advancing the rotary table and article mounted thereon from said first decorating station to said second decorating station so that the article is thereby positioned with the same orientation at said first and second decorating stations;

g. releasing the article while at said second decorating station so as to allow the desired decoration to be applied thereto; and h. decorating the article at said second decorating station.

* * * * *